US011557909B2

(12) United States Patent
Juang et al.

(10) Patent No.: US 11,557,909 B2
(45) Date of Patent: Jan. 17, 2023

(54) BATTERY SYSTEM

(71) Applicant: Apple Inc., Cupertino, CA (US)

(72) Inventors: Philip W. Juang, Mountain View, CA (US); Christopher D. Laws, Campbell, CA (US); Brandon Pierquet, San Francisco, CA (US); Giridhar N. Murching, San Jose, CA (US); William A. Braff, Palo Alto, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/547,318

(22) Filed: Dec. 10, 2021

(65) Prior Publication Data

US 2022/0190607 A1 Jun. 16, 2022

Related U.S. Application Data

(60) Provisional application No. 63/123,748, filed on Dec. 10, 2020.

(51) Int. Cl.
H02J 7/00 (2006.01)
H02J 7/34 (2006.01)
H01M 50/502 (2021.01)
H01M 10/42 (2006.01)
H01M 10/46 (2006.01)

(52) U.S. Cl.
CPC ........... H02J 7/007 (2013.01); H01M 10/425 (2013.01); H01M 10/46 (2013.01); H01M 50/502 (2021.01); H02J 7/0013 (2013.01); H02J 7/0063 (2013.01); H02J 7/342 (2020.01); H01M 2010/4271 (2013.01); H02J 7/0047 (2013.01); H02J 2207/20 (2020.01)

(58) Field of Classification Search
CPC .......... H02J 7/007; H02J 7/342; H02J 7/0063; H02J 2207/20; H02J 7/0047; H01M 50/502; H01M 10/425; H01M 10/46; H01M 2010/4271
See application file for complete search history.

(56) References Cited

U.S. PATENT DOCUMENTS 8,307,930 B2 11/2012 Sailor et al.
9,221,345 B2 12/2015 Bito
(Continued)

FOREIGN PATENT DOCUMENTS

CN         111152655 A    5/2020
KR    10-2017-0025605 A   3/2017
(Continued)

OTHER PUBLICATIONS

International Search Report and Written Opinion dated Apr. 5, 2022, in Intl. App. No. PCT/US2021/062739 (14 pp).

Primary Examiner — Jared Fureman
Assistant Examiner — Duc M Pham
(74) Attorney, Agent, or Firm — Young Basile Hanlon & MacFarlane, P.C.

(57) ABSTRACT

A system includes a first bus, a second bus, a first battery that includes a first plurality of cells, and a second battery that includes a second plurality of cells, wherein the second battery is connected to the second bus. A first converter connects the high-voltage battery to the first bus. A second converter connects the first bus to the second bus. A controller is configured to control operation of the first converter and the second converter.

29 Claims, 5 Drawing Sheets

(56) References Cited

U.S. PATENT DOCUMENTS

| | | |
|---|---|---|
| 9,956,931 B2 | 5/2018 | Janarthanam et al. |
| 10,214,111 B2 | 2/2019 | Hand, III et al. |
| 10,319,536 B1 | 6/2019 | Achrekar |
| 10,581,253 B2 | 3/2020 | Preindl et al. |
| 10,793,019 B2 | 10/2020 | Duan et al. |
| 2012/0025601 A1* | 2/2012 | Nefcy .................. H02J 1/10 180/65.285 |
| 2012/0292987 A1 | 11/2012 | Rutkowski et al. |
| 2013/0200695 A1* | 8/2013 | Fritz .................. B60R 16/03 307/10.1 |
| 2013/0265059 A1 | 10/2013 | Floros et al. |
| 2014/0265559 A1* | 9/2014 | Leehey ................. B60L 7/20 307/10.1 |
| 2016/0137092 A1* | 5/2016 | Thieme ............... B60R 16/03 307/10.6 |
| 2016/0336624 A1 | 11/2016 | Gu et al. |
| 2018/0354387 A1 | 12/2018 | Wand |
| 2020/0001720 A1* | 1/2020 | Pighi .................. B60L 50/10 |
| 2020/0001807 A1* | 1/2020 | Pighi .................. H02J 7/1423 |
| 2022/0111758 A1 | 4/2022 | Ijaz et al. |
| 2022/0111759 A1 | 4/2022 | Ijaz |
| 2022/0115897 A1 | 4/2022 | Ijaz |

FOREIGN PATENT DOCUMENTS

| | | |
|---|---|---|
| WO | 2016083690 A1 | 6/2016 |
| WO | 2022076146 A1 | 4/2022 |

\* cited by examiner

BATTERY SYSTEM

CROSS-REFERENCE TO RELATED APPLICATIONS

This application claims the benefit of U.S. Provisional Patent Application No. 63/123,748, filed on Dec. 10, 2020, the content of which is hereby incorporated by reference in its entirety for all purposes.

TECHNICAL FIELD

This disclosure relates to a battery system.

BACKGROUND

Electric systems typically include various auxiliary components and systems that have different power and redundancy requirements. A primary battery pack may be used to supply power to components that have high power requirements, and an auxiliary battery pack may be used to supply power to components that have low power requirements.

SUMMARY

A system according to a first aspect of the disclosure includes a first bus, a second bus, a first load that is connected to the first bus, a second load that is connected to the second bus, a high-voltage battery that includes a first plurality of cells and outputs electrical power at a first voltage level, and a low-voltage battery that includes a second plurality of cells and outputs electrical power to the second bus at a second voltage level that is lower than the first voltage level. A common cell type is used for the first plurality of cells and the second plurality of cells, and a number of individual cells included in the first plurality of cells is an integer multiple of a number of individual cells that is included in the second plurality of cells. The system according to the first aspect of the disclosure also includes a first DC-DC converter that connects the high-voltage battery to the first bus to transfer electrical power between the high-voltage battery and the first bus, wherein the first DC-DC converter is operable to convert electrical power between the first voltage level and the second voltage level. The system according to the first aspect of the disclosure also includes a second DC-DC converter that connects the first bus to the second bus to transfer electrical power between the first bus and the second bus at the second voltage level. The system according to the first aspect of the disclosure also includes a controller that is configured to control operation of the first DC-DC converter and the second DC-DC converter in one of a first operating mode in which the first load and the second load are powered by the high-voltage battery, a second operating mode in which the first load and the second load are powered by the low-voltage battery, and a third operating mode in which the high-voltage battery is charged by the low-voltage battery.

In some implementations of the system according to the first aspect of the disclosure, the individual cells from the first plurality of cells are connected in series and the individual cells from the second plurality of cells are connected in series. In some implementations of the system according to the first aspect of the disclosure, the first plurality of cells is not directly connected to the second plurality of cells. Some implementations of the system according to the first aspect of the disclosure also include a housing, wherein the high-voltage battery and the low-voltage battery are located in the housing.

In some implementations of the system according to the first aspect of the disclosure, in the first operating mode, electrical power is supplied to the first bus by the high-voltage battery using the first DC-DC converter, electrical power is transferred from the first bus to the second bus by the second DC-DC converter, the first load receives electrical power from the first bus, and the second load receives electrical power from the second bus. In some implementations of the system according to the first aspect of the disclosure, in the second operating mode, electrical power is supplied to the second bus by the low-voltage battery, electrical power is transferred from the second bus to the first bus by the second DC-DC converter, the first load receives electrical power from the first bus, and the second load receives electrical power from the second bus. In some implementations of the system according to the first aspect of the disclosure, in the third operating mode, electrical power is supplied to the second bus by the low-voltage battery, electrical power is transferred from the second bus to the first bus by the second DC-DC converter, and electrical power is transferred from the first bus to the high-voltage battery using the first DC-DC converter to charge the high-voltage battery.

A system according to a second aspect of the disclosure includes a first bus, a second bus, a high-voltage battery that includes a first plurality of cells, and a low-voltage battery that includes a second plurality of cells, wherein the low-voltage battery is connected to the second bus. A first DC-DC converter connects the high-voltage battery to the first bus. A second DC-DC converter connects the first bus to the second bus. A controller is configured to control operation of the first DC-DC converter to transfer power between the high-voltage battery and the first bus and to control operation of the second DC-DC converter to transfer power between the first bus and the second bus.

In some implementations of the system according to the second aspect of the disclosure, a common cell type is used for the first plurality of cells and the second plurality of cells. In some implementations of the system according to the second aspect of the disclosure, a number of individual cells included in the first plurality of cells is an integer multiple of a number of individual cells that is included in the second plurality of cells. In some implementations of the system according to the second aspect of the disclosure, the first plurality of cells includes a first number of individual cells that are connected in series and the second plurality of cells includes a second number of individual cells that are connected in series. In some implementations of the system according to the second aspect of the disclosure, the first plurality of cells is not directly connected to the second plurality of cells. In some implementations of the system according to the second aspect of the disclosure, the first DC-DC converter is operable to convert electrical power between a first voltage level that corresponds to the high-voltage battery and a second voltage level that corresponds to the first bus. In some implementations of the system according to the second aspect of the disclosure, the first bus and the second bus are at a common voltage level, and the second DC-DC converter is operable to transfer electrical power between the first bus and the second bus at the common voltage level. In some implementations of the system according to the second aspect of the disclosure, only the second DC-DC converter connects the first bus to the second bus for transferring electrical power between the first bus and the second bus.

A system according to a third aspect of the disclosure includes a first bus, a second bus, a first load that is connected to the first bus, and a second load that is connected to the second bus. A high-voltage battery includes a first plurality of cells. A low-voltage battery includes a second plurality of cells, wherein the low-voltage battery is connected to the second bus. A first DC-DC converter connects the high-voltage battery to the first bus. A second DC-DC converter connects the first bus to the second bus. A controller is configured to control operation of the first DC-DC converter and the second DC-DC converter in one of a first operating mode in which the first load and the second load are powered by the high-voltage battery, a second operating mode in which the first load and the second load are powered by the low-voltage battery, and a third operating mode in which the high-voltage battery is charged by the low-voltage battery.

In some implementations of the system according to the third aspect of the disclosure, in the first operating mode, electrical power is supplied to the first bus by the high-voltage battery using the first DC-DC converter, electrical power is transferred from the first bus to the second bus by the second DC-DC converter, the first load receives electrical power from the first bus, and the second load receives electrical power from the second bus. In some implementations of the system according to the third aspect of the disclosure, in the second operating mode, electrical power is supplied to the second bus by the low-voltage battery, electrical power is transferred from the second bus to the first bus by the second DC-DC converter, the first load receives electrical power from the first bus, and the second load receives electrical power from the second bus. In some implementations of the system according to the third aspect of the disclosure, in the third operating mode, electrical power is supplied to the second bus by the low-voltage battery, electrical power is transferred from the second bus to the first bus by the second DC-DC converter, and electrical power is transferred from the first bus to the high-voltage battery using the first DC-DC converter to charge the high-voltage battery. In some implementations of the system according to the third aspect of the disclosure, the first DC-DC converter is operable to convert electrical power between a first voltage level that corresponds to the high-voltage battery and a second voltage level that corresponds to the first bus. In some implementations of the system according to the third aspect of the disclosure, the first bus and the second bus are at a common voltage level, and the second DC-DC converter is operable to transfer electrical power between the first bus and the second bus at the common voltage level. In some implementations of the system according to the third aspect of the disclosure, a common cell type is used for the first plurality of cells and the second plurality of cells.

A system according to a fourth aspect of the disclosure includes a first bus, a second bus, a first load that is connected to the first bus, and a second load that is connected to the second bus. A high-voltage battery includes a first plurality of cells and outputs electrical power at a first voltage level. A low-voltage battery includes a second plurality of cells and outputs electrical power to the second bus at a second voltage level that is lower than the first voltage level, wherein a common cell type is used for the first plurality of cells and the second plurality of cells. A first DC-DC converter connects the high-voltage battery to the first bus. A second DC-DC converter connects the first bus to the second bus. A controller is configured to control operation of the first DC-DC converter and the second DC-DC converter to selectively supply electrical power from the high-voltage battery to the first load and the second load or supply electrical power from the low-voltage battery to the first load and the second load.

In some implementations of the system according to the fourth aspect of the disclosure, the first DC-DC converter is operable to convert electrical power between the first voltage level and the second voltage level. In some implementations of the system according to the fourth aspect of the disclosure, the first bus and the second bus are at the second voltage level, and the second DC-DC converter is operable to transfer electrical power between the first bus and the second bus at the second voltage level. In some implementations of the system according to the fourth aspect of the disclosure, the system further includes a housing, wherein the high-voltage battery and the low-voltage battery are located in the housing. In some implementations of the system according to the fourth aspect of the disclosure, the first plurality of cells is not directly connected to the second plurality of cells.

DETAILED DESCRIPTION

This disclosure relates to a battery system that includes a high-voltage (HV) battery and a low-voltage (LV) battery that are integrated into a battery pack. The battery system described herein is intended for use in an electric system in which the battery pack is the primary power source for one or more loads, such as propulsion motors. The HV battery and the LV battery are included in the battery pack to service different classes of loads that are commonly present in an electric system. For example, a first bus, which may be referred to as a high-voltage bus, may service loads that include a propulsion motor and a second bus, which may be referred to as a low-voltage bus, may service loads that include a computing system of the electric system (e.g., that controls automated control functions of the electric system). It should be understood, however, that the battery system described herein could be used to provide power in various applications.

The HV battery and the LV battery may use common (i.e., the same type) electrochemical cell types having the same battery chemistry. The HV battery and the LV battery may also be packaged in a common structure (e.g., housing). By integrating the HV battery and the LV battery and by using common electrochemical cell types, the overall complexity of the battery system may be reduced and efficiencies in packaging may result. To efficiently use the HV battery and the LV battery in combination, the battery system may be controlled to vary the way in which power is supplied to various components using the HV battery and the LV battery. Control of the power use from the HV battery and the LV battery can be exercised in a way that prevents leaving substantial amounts of power from the LV battery unused when the HV battery is depleted.

Figure 1:
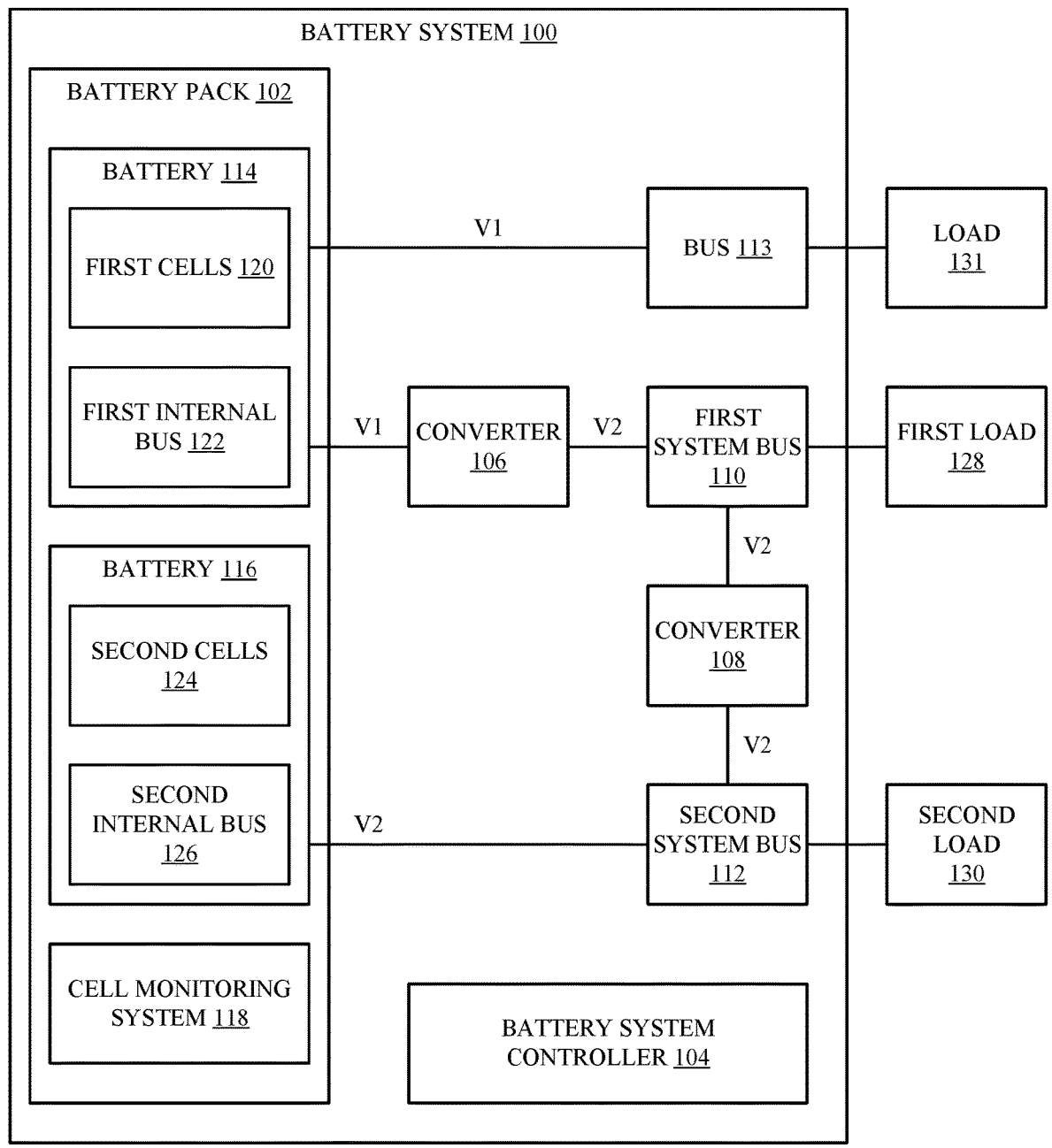
FIG. 1 is a block diagram that shows an example of a battery system that includes a battery pack.

FIG. 1 is a block diagram that shows an example of a battery system 100. The battery system 100 includes a battery pack 102, a battery system controller 104, an HV-LV converter 106, and LV-LV converter 108, a first battery system bus 110, a second battery system bus 112, and an HV bus 113.

The battery pack 102 includes an HV battery 114 and an LV battery 116. The battery pack 102 also includes a cell monitoring system 118 that is configured to monitor properties of individual cells from the HV battery 114 and the LV battery 116. The HV battery 114 of the battery pack 102 may perform functions equivalent to those performed by a primary battery pack in a conventional system, such as by functioning to supply power to components that have high power requirements including a propulsion motor of the electric system. The LV battery 116 of the battery pack 102 may perform functions equivalent to those performed by an auxiliary battery pack in a conventional system, such as by functioning to supply power to components that have low power requirements including computing systems of the electric system.

The HV battery 114 is an electric battery that is configured to be charged and discharged in a conventional manner. The HV battery 114 is connected to the HV-LV converter 106 and is configured to supply electric power to the first battery system bus 110 using the HV-LV converter 106. Thus, the HV battery 114 is connected to the first battery system bus 110 by the HV-LV converter. Electric power is output by the HV battery 114 to the HV-LV converter 106 at a first voltage level V1. The first voltage level V1 is a nominal output voltage of the HV battery 114 under normal operating conditions and subject to normal fluctuations. As an example, the first voltage level V1 may be between three-hundred and three-thousand volts.

The HV battery 114 includes first cells 120 and a first internal battery bus 122. The first cells 120 are electrochemical cells that use any suitable battery chemistry. The first cells 120 may be referred to as first cells, a first plurality of cells, cells of the HV battery, and/or HV cells, which are names of convenience and imply no specific features or characteristics. The first cells 120 may all be of the same cell type and may therefore be identical to each other in battery chemistry, cell voltage (e.g., measured in volts), and cell capacity (e.g., measured in Ampere-hours). The first internal battery bus 122 electrically connects the first cells 120 of the HV battery 114 to each other and connects the HV battery 114 to external components (e.g., using terminals that are associated with the HV battery 114), such as the HV-LV converter 106.

To connect the first cells 120 to each other, the first internal battery bus 122 may include bus bars that are each connected to one or more of the first cells 120. The configuration of the first internal battery bus 122 controls the manner in which the first cells 120 of the HV battery 114 are connected to each other. As an example, the first internal battery bus 122 of the HV battery 114 may be configured so that all of the first cells 120 of the HV battery 114 are connected in series. Other configurations may be used including, for example, combinations of series and parallel connections of the first cells 120 of the HV battery 114.

The LV battery 116 is an electric battery that is configured to be charged and discharged in a conventional manner. The LV battery 116 is connected to the second battery system bus 112 of the battery system 100 and is configured to supply electric power to the second battery system bus 112. The LV battery 116 may be directly connected to the second battery system bus 112 without an intervening converter (e.g., a DC-DC converter). Electric power is output by the LV battery 116 to the second battery system bus 112 at a second voltage level V2. The second voltage level V2 is a nominal output voltage of the LV battery 116 under normal operating conditions and subject to normal fluctuations. As an example, the second voltage level V2 may be between twelve volts and one-hundred volts.

The LV battery 116 includes second cells 124 and a second internal battery bus 126. The second cells 124 may be referred to as second cells, a second plurality of cells, cells of the LV battery, and/or LV cells, which are names of convenience and imply no specific features or characteristics. The second cells 124 are electrochemical cells that use any suitable battery chemistry. The second cells 124 may all be of the same cell type and may therefore be identical to each other in battery chemistry, cell voltage (e.g., measured in volts), and cell capacity (e.g., measured in Ampere-hours). In addition, all of the cells from the first cells 120 and all of the cells from the second cells 124 may all be of the same cell type. The second internal battery bus 126 electrically connects the second cells 124 of the LV battery 116 to each other and connects the LV battery 116 to external components (e.g., using terminals that are associated with the LV battery 116), such as the second battery system bus 112.

To connect the second cells 124 to each other, the second internal battery bus 126 may include bus bars that are each connected to one or more of the second cells 124. The configuration of the second internal battery bus 126 controls the manner in which the second cells 124 of the LV battery 116 are connected to each other. As an example, the second internal battery bus 126 of the LV battery 116 may be configured so that all of the second cells 124 of the LV battery 116 are connected in series. Other configurations may be used including, for example, combinations of series and parallel connections of the second cells 124 of the LV battery 116.

The first cells 120 are not directly connected electrically to the second cells 124. Instead, the HV-LV converter 106 and the LV-LV converter 108 are electrically interposed between the first cells 120 and the second cells 124, so that any power transfer between the first cells 120 and the second cells 124 flows through the HV-LV converter 106 and the LV-LV converter 108.

The battery system controller 104 is a computing device. The battery system controller 104 may include for example, a processor, memory, and storage. The battery system controller 104 may be or include an application-specific integrated circuit. The battery system controller 104 may be or include a system on a chip. The battery system controller 104 is operable to execute computer program instructions and perform operations described by the computer program instructions.

The battery system controller 104 is operable to control operation of components that are included in the battery system 100. For example, the battery system controller 104 may receive information from components of the battery system 100 and/or external components (e.g., belonging to systems other than the battery system 100), make one or more decisions using the received information, and send one or more commands to components of the battery system 100 to cause operation of the components in accordance with the commands. As examples, the battery system controller 104 may receive information from the HV-LV converter 106, the LV-LV converter 108, and/or the cell monitoring system 118. As examples, the battery system controller 104 may send commands to the HV-LV converter 106, the LV-LV converter 108, and/or the cell monitoring system 118. Operation of the battery system controller 104 will be discussed further herein.

The HV-LV converter 106 is a DC-DC converter (e.g., a first DC-DC converter) that is connected to the HV battery 114 and the first battery system bus 110. The HV-LV converter 106 is a bidirectional power converter that is configured to transfer electrical power between the HV battery 114 and the first battery system bus 110 while raising or lowering the voltage dependent on the direction of the transfer. The HV-LV converter 106 is operable to convert electrical power between the first voltage level V1, which corresponds to the voltage output by the HV battery 114, and the second voltage level V2, which corresponds to voltage of the first battery system bus 110, the second battery system bus 112, and the voltage output by the LV battery 116. Thus, the HV-LV converter 106 can transfer electrical power from the HV battery 114 to the first battery system bus 110 by decreasing the voltage from the first voltage level V1 to the second voltage level V2. The HV-LV converter 106 may be implemented using any suitable converter architecture, such as a switched-type converter architecture (e.g., implemented using transistors). The HV-LV converter 106 is controllable, for example, by the battery system controller 104, to regulate the direction of power transfer, the amount of power transfer, and the output current.

The LV-LV converter 108 is a DC-DC converter (e.g., a second DC-DC converter) that is connected to the first battery system bus 110 and the second battery system bus 112. The LV-LV converter 108 is a bidirectional power converter that is configured to transfer electrical power between the first battery system bus 110 and the second battery system bus 112 at the second voltage level V2. The LV-LV converter 108 may be implemented using any suitable converter architecture, such as a switched-type converter architecture (e.g., implemented using transistors). The LV-LV converter 108 is controllable, for example, by the battery system controller 104, to regulate the direction of power transfer, the amount of power transfer, and the output current. Thus, the first battery system bus 110 and the second battery system bus 112 are at a common (i.e., same) voltage level, and the LV-LV converter 108 is operable to transfer electrical power between the first battery system bus 110 and the second battery system bus 112 at the common voltage level.

The first battery system bus 110 and the second battery system bus 112 are electrical power distribution systems (e.g., including electrical conductors and, optionally, other power distribution hardware) that connect the battery pack 102 to loads so that the HV battery 114 and the LV battery 116 can supply electrical power to the loads. Each of the first battery system bus 110 and the second battery system bus 112 can be connected to multiple loads (e.g., dozens of loads). In the illustrated example, a first load 128 is depicted as a representation of a load that can be connected to the first battery system bus 110, and a second load 130 is depicted as a representation of a load that can be connected to the second battery system bus 112. Thus, in the illustrated example, power is supplied to the first load 128 using the first battery system bus 110 and power is supplied to the second load 130 using the second battery system bus 112.

In the illustrated implementation, the battery system 100 includes the first battery system bus 110 and the second battery system bus 112. In some implementations, one or more additional buses may be included in the battery system 100 to serve other loads at the second voltage level V2. For example, a third battery system bus could be supplied power from one or both of the first battery system bus 110 and the second battery system bus 112 by active controlled components or by passive components. In a particular implementation, a third battery system bus could be supplied power from one or both of the first battery system bus 110 and the second battery system bus 112 by diodes, such as a first diode (or a first group of diodes) that connects the first battery system bus 110 to the third battery system bus and a second diode (or a second group of diodes) that connects the second battery system bus 112 to the third battery system bus. The control methods described herein remain applicable.

In the illustrated implementation, the battery system 100 includes the first battery system bus 110 and the second battery system bus 112, which are connected by the LV-LV converter 108. In an alternative implementation, the LV-LV converter 108 may be omitted so that the first battery system bus 110 and the second battery system bus 112 are combined into a single battery system bus. The control methods described herein remain applicable except that power is not transferred between buses using the LV-LV converter 108.

The HV bus 113 is an electrical power distribution system (e.g., including electrical conductors and, optionally, other power distribution hardware) that connects the HV battery 114 of the battery pack 102 to high-voltage loads at the first voltage level V1. In the illustrated example, an HV load 131 is included as an example of a high-voltage load, but multiple high-voltage loads may be served by the HV bus 113. As an example, the HV load 131 may be or include DC-AC converters that supply power to one or more propulsion motors of the electric system.

Figure 2:
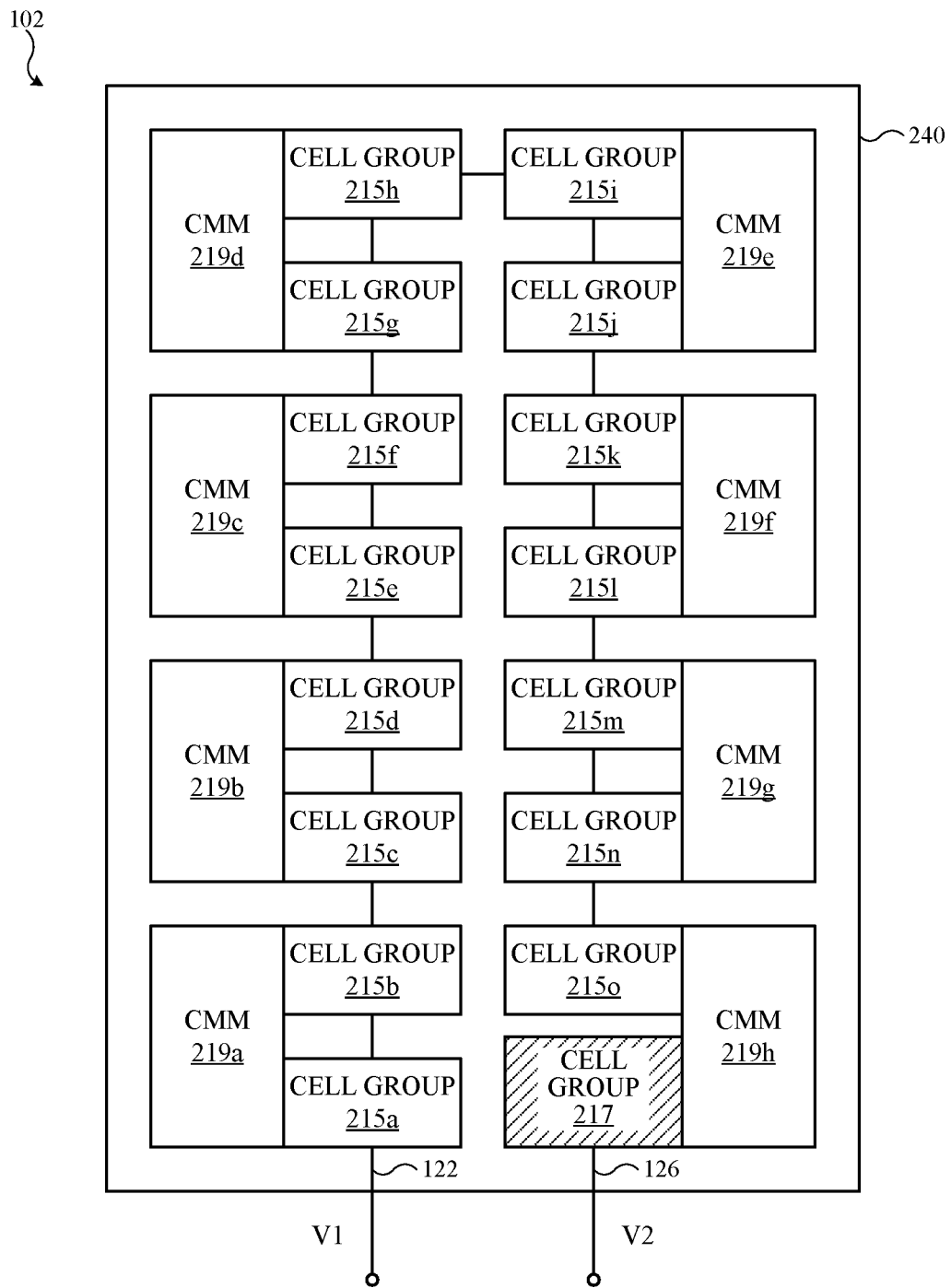
FIG. 2 is a schematic illustration that shows an example of the battery pack.

FIG. 2 is a schematic illustration that shows an example of the battery pack 102. The battery pack 102 includes a housing 240. The housing 240 is a structure that defines an internal space. The HV battery 114 and the LV battery 116 are located in the internal space of the housing 240 (e.g., located inside the housing 240).

The housing 240 may be a rigid structure, for example, formed from one or more of metal, rigid plastics, and/or rigid composite materials. The housing 240 may be a sealed structure that, for example, is configured to prevent water and other liquids from entering the internal space of the housing. As an example, the housing 240 may be formed from two or more components that are joined by sealing members (e.g., gaskets) and are rigidly fastened to each other (e.g., by bolts, clamps, and/or other mechanical fastening structures).

In addition to the HV battery 114 and the LV battery 116, other components may be located in the housing 240 of the battery pack 102. As one example, some or all of the components of the cell monitoring system 118 are located in the housing 240, such as electrical connections to the first internal battery bus 122 and the second internal battery bus 126 that allow monitoring and/or balancing of individual cells or groups of cells from the first cells 120 of the HV battery 114 and the second cells 124 of the LV battery 116. As another example, the battery system controller 104 may be located in the housing 240 of the battery pack 102. As another example, the HV-LV converter 106 may be located in the housing 240 of the battery pack 102. As another example, the LV-LV converter may be located in the housing 240 of the battery pack 102. As another example, cooling system components may be location in the housing 240 of the battery pack 102 to cool the HV battery 114 and the LV battery 116 using a chilled cooling media that is supplied from an external source.

The first cells 120 of the HV battery 114 may be arranged in groups of cells. The cells may be grouped in various ways. For example, each of the groups of cells may be arranged in a particular geometric grouping, such as in a stack, or may be located within a separate housing or container structure that is located in the housing 240 of the battery pack 102.

In the illustrated example, the HV battery 114 includes fifteen groups of cells, which are represented by first through fifteenth HV cell groups 215a-215o. The first through fifteenth HV cell groups 215a-215o are connected to each other (e.g., in series) to define the HV battery 114. The first through fifteenth HV cell groups 215a-215o may all be identically configured, for example, each including identical cells in the same number, and in the same wiring connection configuration. For example, each of the first through fifteenth HV cell groups 215a-215o may include the same number of identical cells in a series configuration, such as, for example, fourteen series connected cells (e.g., a 14s1p configuration). The illustrated implementation is shown as an example only, and the number of groups of cells and their configurations may vary.

The second cells 124 of the LV battery 116 may be arranged in groups of cells as described with respect to the HV battery 114. In the illustrated implementation, the LV battery includes only one group of cells, which is represented by an LV cell group 217. In alternative implementations, the second cells 124 of the LV battery 116 may be grouped into more than one cell group.

The number of cells and the wiring configuration of the cells in the LV cell group 217 may be identical to that of the first through fifteenth HV cell groups 215a-215o. Thus, the LV cell group 217 may be identical to each of the first through fifteenth HV cell groups 215a-215o. As a result of this, the total number of individual cells that are included in the first cells 120 of the HV battery 114 may be an integer multiple of the total number of individual cells that are included in the second cells 124 of the LV battery 116.

The cell monitoring system 118 may include multiple cell monitoring modules that are each connected to one or more of the groups of cells of the HV battery 114 and the LV battery 116. In the illustrated example, the cell monitoring system 118 includes first through eighth cell monitoring modules 219a-219h that are each connected to two cell groups. The first through seventh cell monitoring modules 219a-219g are connected to the first through fourteenth HV cell groups 215a-215n. The eighth cell monitoring module 219h is connected to the fifteenth HV cell group 215o and to the LV cell group 217. Each of the first through eighth cell monitoring modules 219a-219h includes wiring connections for monitoring individual cells from its respective cell groups as well as cell monitoring and balancing circuitry that is operable to monitor operating characteristics (e.g., state of charge) of each of the cells individually and to balance charge among the cells in a cell group.

Figure 3:
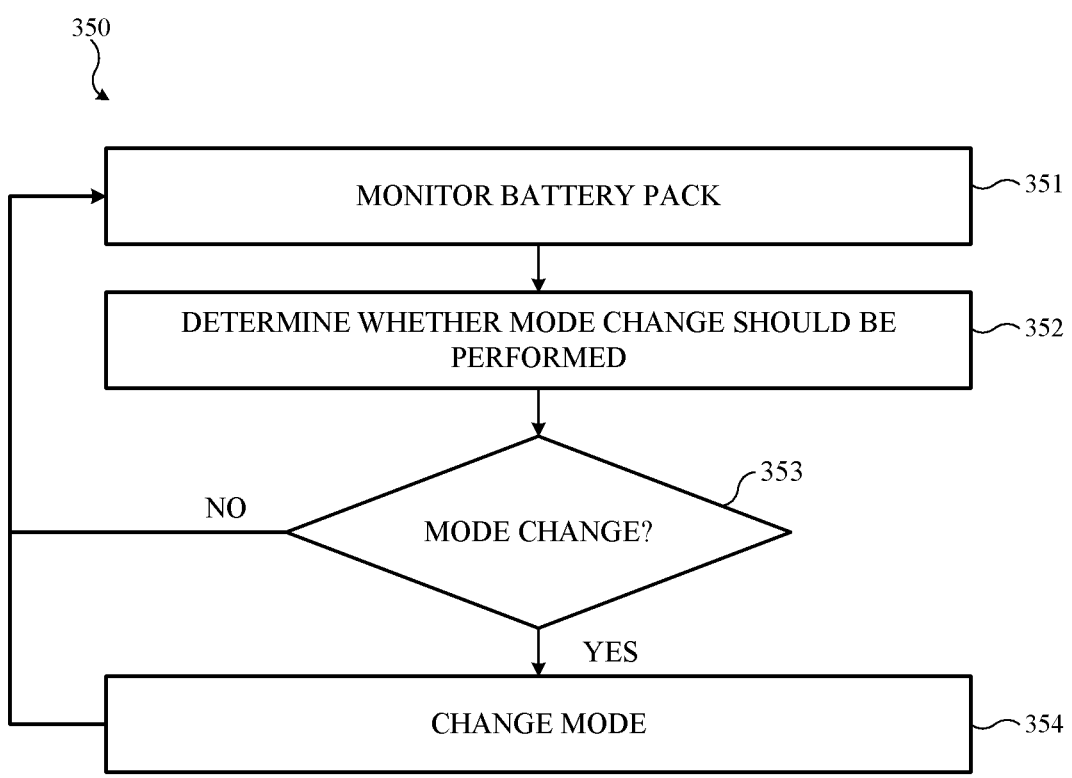
FIG. 3 is a flowchart that shows a process for controlling the battery system.

FIG. 3 is a flowchart that shows a process 350 for controlling the battery system 100. The process 350 may be performed, for example, using a computing device (e.g., including one or more processors) that executes program instructions that implement the operations of the process 350. The process 350 may be implemented using a non-transitory computer-readable storage device having program instructions that, when executed by a computing device, cause performance of the operations of the process 350 by the computing device. In the implementation that is described herein, the process is performed using the battery system controller 104 of the battery system 100.

The process 350 is used to cause the battery system 100 to operate in a desired operating mode. Each of the operating modes represents a different way that the power supplied by the HV battery 114 and the LV battery 116 can be distributed to other components of the battery system 100.

In the implementation that is described herein, the battery system controller 104 is operable to control operation of the HV-LV converter 106 and the LV-LV converter 108 in one of a first operating mode, a second operating mode, and a third operating mode. It should be understood that other operating modes can be used in addition to the operating modes that are described herein.

The first operating mode is a normal operating mode in which the HV battery 114 has primary responsibility for supplying power to the loads connected to the battery system 100, including the first load 128 and the second load 130. In the first operating mode, electrical power is supplied to the first battery system bus 110 by the HV battery 114 using the HV-LV converter 106, electrical power is transferred from the first battery system bus 110 to the second battery system bus 112 by the LV-LV converter 108, the first load 128 receives electrical power from the first battery system bus 110, and the second load 130 receives electrical power from the second battery system bus 112. Loads that are connected to the first battery system bus 110 are powered only by the HV battery 114 and loads that are connected to the second battery system bus 112 are powered at least partly by the HV battery 114 in the first operating mode. As an example, the loads that are connected to the second battery system bus 112 (e.g., including the second load 130) may be powered primarily or only by the HV battery 114 in the first operating mode.

Additional power can be supplied to loads that are connected to the second battery system bus 112 from the LV battery 116 in the first operating mode in order to provide sufficient power to meet peak current demands. The LV battery 116 does not supply power to the first battery system bus 110 in the first operating mode, for example, because the LV-LV converter 108 is transferring power from the first battery system bus 110 to the second battery system bus 112 in the first operating mode. Thus, the first load 128 is powered only by the HV battery 114 and the second load 130 is powered primarily by the HV battery 114 in the first operating mode, while additional power may be supplied from the LV battery 116 to the second load 130 in the first operating mode.

The second operating mode shifts responsibility for powering the second battery system bus 112 to the LV battery 116 and power from the LV battery 116 may be supplied to the first battery system bus 110 in order to reduce the state of charge of the LV battery 116 at a faster rate than in the first operating mode. In the second operating mode, electrical power is supplied to the second battery system bus 112 by the LV battery 116, electrical power is transferred from the second battery system bus 112 to the first battery system bus 110 by the LV-LV converter 108, the first load 128 receives electrical power from the first battery system bus 110, and the second load 130 receives electrical power from the second battery system bus 112. Loads that are connected to the first battery system bus 110 are powered by either of the HV battery 114 alone, the LV battery 116 alone, or the HV battery 114 in combination with the LV battery 116 in the second operating mode. Thus, for example, the first load 128 may be powered partly by the LV battery 116, primarily by the LV battery 116, or only by the LV battery 116 in the second operating mode.

Additional power can be supplied to loads that are connected to the first battery system bus 110 by the HV battery 114 in the second operating mode in order to provide sufficient power to meet peak current demands. The HV battery 114 does not supply power to the second battery system bus 112 in the second operating mode, for example, because the LV-LV converter 108 is transferring power from the second battery system bus 112 to the first battery system bus 110 in the second operating mode. Thus, the first load 128 may be powered primarily by the LV battery 116 in the second operating mode and additional power may be supplied from the HV battery 114 to the first load 128 in the second operating mode. The second load 130 is powered only by the LV battery 116 in the second operating mode.

The third operating mode is similar to the second operating mode, except that the HV battery 114 is charged by the LV battery 116 in the third operating mode by transferring power to the HV battery 114 and/or to the HV bus 113 using the HV-LV converter 106. In the third operating mode, electrical power is supplied to the second battery system bus 112 by the LV battery 116, electrical power is transferred from the second battery system bus 112 to the first battery system bus 110 by the LV-LV converter 108, and electrical power is transferred from the first battery system bus 110 to the HV battery 114 using the HV-LV converter 106 to charge the HV battery 114 and/or to supply power to the HV bus 113 to power the HV load 131.

The third operating mode allows the LV battery 116 to be discharged at a greater rate as compared to the second operating mode, and may increase the state of charge of the HV battery 114. For example, the LV battery 116 may supply electrical power to loads connected to the first battery system bus 110 and the second battery system bus 112 in the third operating mode, and power supplied by the LV battery 116 that exceeds the power demands of the loads connected to the first battery system bus 110 and the second battery system bus 112 is transferred from the first battery system bus 110 to the HV battery 114 by the HV-LV converter 106 to charge the HV battery 114 and/or to supply power to the HV bus 113 to power the HV load 131 using power from the LV battery 116.

Power is supplied to the first battery system bus 110 primarily by the LV battery 116 in the third operating mode and power is supplied to the second battery system bus 112 only by the LV battery 116 in the third operating mode. Thus, loads connected to the first battery system bus 110, such as the first load 128, are powered primarily by the LV battery 116 in the third operating mode. Power from the HV battery 114 may be used to supply power to the first battery system bus 110 to satisfy peak power demands for loads that are connected to the first battery system bus 110 by temporarily switching operation of the HV-LV converter 106 so that it supplies power to the first battery system bus 110, and operation of the HV-LV converter 106 is switched back to charging the HV battery 114 when peak power demands have passed and the LV battery 116 is again able to satisfy the power demands of both of the first battery system bus 110 and the second battery system bus 112.

In implementations where a generator (e.g., for regenerative braking) is connected to one of the first battery system bus 110 or the second battery system bus 112, each of the first operating mode, the second operating mode, or the third operating mode may include receiving a supply of electrical power from the generator (e.g., which may be the first load 128 or the second load 130). The power from the generator may be used to charge the HV battery 114 and/or the LV battery 116. Other details of the first operating mode, the second operating mode, and the third operating mode are as previously described.

Selection of an operating mode for the battery system 100 and transitions between operating modes according to the process 350 will now be described using the first operating mode, the second operating mode, and the third operating mode as examples of operating modes. The process 350 may be implemented using additional and/or different operating modes.

The process 350 is performed to control supply of power to the first battery system bus 110 and the second battery system bus 112 from the battery pack while a load that is connected to one of the first battery system bus 110 or the second battery system bus 112 is requesting power. Thus, the process may be initiated when a component that is connected to the first battery system bus 110 or the second battery system bus 112 is activated and is drawing power from the HV battery 114 or the LV battery 116 over the first battery system bus 110 or the second battery system bus 112. The process 350 may be performed repeatedly while one or more loads continue to draw power from the battery pack 102.

In operation 351 the battery pack 102 is monitored. The battery pack 102 can be monitored using components that are included in the battery system 100. For example, the battery pack 102 can be monitored using the cell monitoring system 118 as previously described. Monitoring the battery pack 102 can include determining a state of charge for the HV battery 114, determining a power usage rate (e.g., discharge rate) for the HV battery 114, determining a temperature of the HV battery 114, determining an estimated time until full discharge (e.g., zero percent state of charge) for the HV battery 114, determining a future state of charge over time forecast for the HV battery 114, monitoring other operating characteristics of the HV battery 114, determining a state of charge for the LV battery 116, determining a power usage rate (e.g., discharge rate) for the LV battery 116, determining a temperature of the LV battery 116, determining an estimated time until full discharge (e.g., zero percent state of charge) for the LV battery 116, determining a future state of charge over time forecast for the LV battery 116, and/or monitoring other operating characteristics of the LV battery 116. The information that is obtained by monitoring the battery pack 102 may be transmitted to the battery system controller 104, for example, from the cell monitoring system 118.

The times until discharge of the HV battery 114 and the LV battery 116 are estimated values. These values may be estimated, for example using a state of charge value and a power usage rate for each of the HV battery 114 and the LV battery 116. Future state of charge forecasts for the HV battery 114 and the LV battery 116 are also estimated. Times until discharge and future state of charge forecasts may be determined using information from the electric system that describes an intended navigation route for the electric system (under manual or automated control), including information that describes expected future route and road conditions.

Operation 352 includes determining whether a mode change should be performed from a current operating mode to a different operating mode. Determining whether a mode change should be performed may be done using the information that was obtained by monitoring the battery pack 102 in operation 351. For example, the battery system controller 104 may determine whether a mode change should be performed based on a comparison of the estimated time until full discharge for the HV battery 114 and the estimated time until full discharge for the LV battery 116. Operation 352 may also include determining which mode the battery system 100 should be switched to.

As one example, the battery system controller 104 may determine that a mode switch should be performed when a difference between the state of charge of the HV battery 114 and the state of charge of the LV battery 116 is above a threshold value. As another example, the battery system controller 104 may determine that a mode switch should be performed when a difference between the rate of power usage of the HV battery 114 and the rate of power usage of the LV battery 116 is above a threshold value. As another example, the battery system controller 104 may determine that a mode switch should be performed when a difference between the time until full discharge of the HV battery 114 and the time until full discharge of the LV battery 116 is above a threshold value.

In some implementations, the battery system controller selects the first operating mode when power usage of loads connected to the first battery system bus 110 and the second battery system bus 112 (and optionally additional buses) is above a threshold value and selects one of the second operating mode or the third operating mode when the power usage is below a threshold value.

In some implementations, multiple values describing operating conditions are used to determine whether to switch the operating mode and/or which operating mode should be switched to. Any of the values obtained by monitoring the battery pack 102 (e.g., as described with respect to operation 351) may be used. As one example, switching between modes can be controlled using a state machine that requires a set of conditions to be satisfied in order to perform a particular change between operating modes (e.g., from the first operating mode to the second operating mode or from the third operating mode to the first operating mode). As another example a score can be determined for each of the operating modes using the values obtained by monitoring the battery pack 102 in operation 351 and the highest scoring operating mode may be selected, thereby prompting a mode change if the selected mode is different than the current mode.

In operation 353, if a mode change will be performed according to the determination made in operation 352, the process proceeds to operation 354. In operation 353, if a mode change will not be performed according to the determination made in operation 352, the process 350 returns to operation 351 to continue monitoring the battery pack 102 and assessing whether a mode change should be performed.

In operation 354, the mode change is performed from the current operating mode to a new operating mode, and the battery system 100 is operated in the new operating mode. The process 350 then returns to operation 351 to continue monitoring the battery pack 102 and assessing whether a mode change should be performed.

Figure 4:
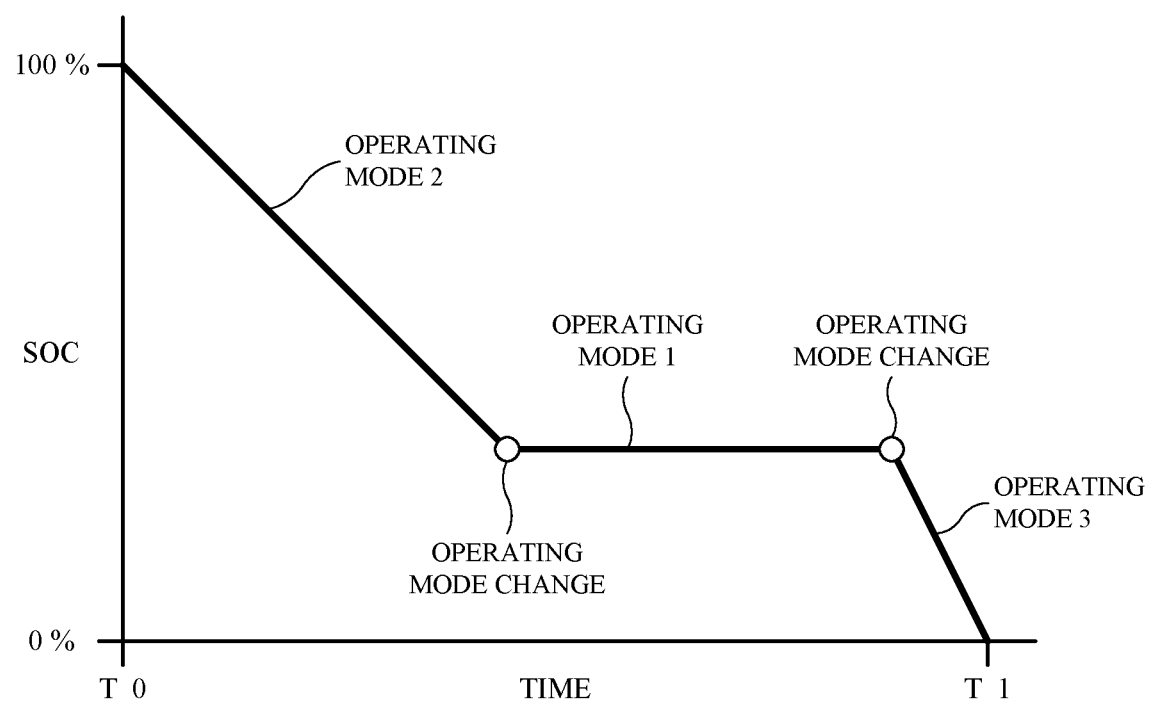
FIG. 4 is a graph that shows a state of charge of a low-voltage battery of the battery pack during operation of the battery system.

FIG. 4 is a graph that shows a state of charge of the LV battery 116 during operation of the battery system 100. The horizontal axis corresponds to time, with T_0 representing a start of operation of the battery system 100 and T_1 representing an end of operation of the battery system 100, with the state of charge of the LV battery 116 being one-hundred percent at time point T_0 and with the state of charge of the LV battery 116 being zero percent at the time point T_1. To optimize usage of the battery pack 102, the state of charge of the HV battery 114 should also decrease from one-hundred percent at time point T_0 to zero percent at the time point T_1. Because the rate of discharge for the HV battery 114 and the LV battery 116 is usually not the same, the battery system 100 is controlled (e.g., by the battery system controller 104) to change to the operating mode of the battery system 100 during operation. In the illustrated example, the battery system 100 is initially (e.g., starting at T_0) operated in the second operation mode. Subsequently, the operating mode is changed from the second operating mode to the first operating mode, and discharging of the LV battery 116 slows. Later, the operating mode is changed to the third operating mode, and the LV battery 116 is discharged at a higher rate as compared to the rate of discharge for the LV battery 116 in the first operating mode and the second operating mode.

In the present disclosure, state of charge values are used to represent the amount of electrical power that is stored in a battery. State of charge values are estimated. As one example, state of charge may be estimated based on voltage. As another example, state of charge may be estimated based on current integration over time. State of charge values are typically expressed as percentage values, relative to set points for zero percent and one-hundred percent, which may be predetermined values or calculated values. Zero percent state of charge is used to represent a charge state in which the battery is not able to continue supplying electrical power. One-hundred percent state of charge is used to represent a charge level at which further charging of the battery is discontinued, and is therefore indicated as a fully charged state.

The battery system 100 may be implemented in a vehicle. The battery system 100 supplies electrical power to some or all of the systems that are included in the vehicle. As an example, the vehicle may be a conventional road-going vehicle that includes a vehicle body and is supported by wheels. The vehicle may be, for example, a car, a truck, a motorcycle, a boat, or an aircraft. The vehicle may include a passenger compartment and/or a cargo compartment. The vehicle may include system that perform specific functions, such as a suspension system, a propulsion system, a braking system, a steering system, a sensing system, and a control system. The sensing system includes sensors for observing external conditions and conditions of the vehicle. The control system includes communication components and processing components, such as a controller, and may be configured to control automated driving functions. Other systems can be included in the vehicle.

Figure 5:
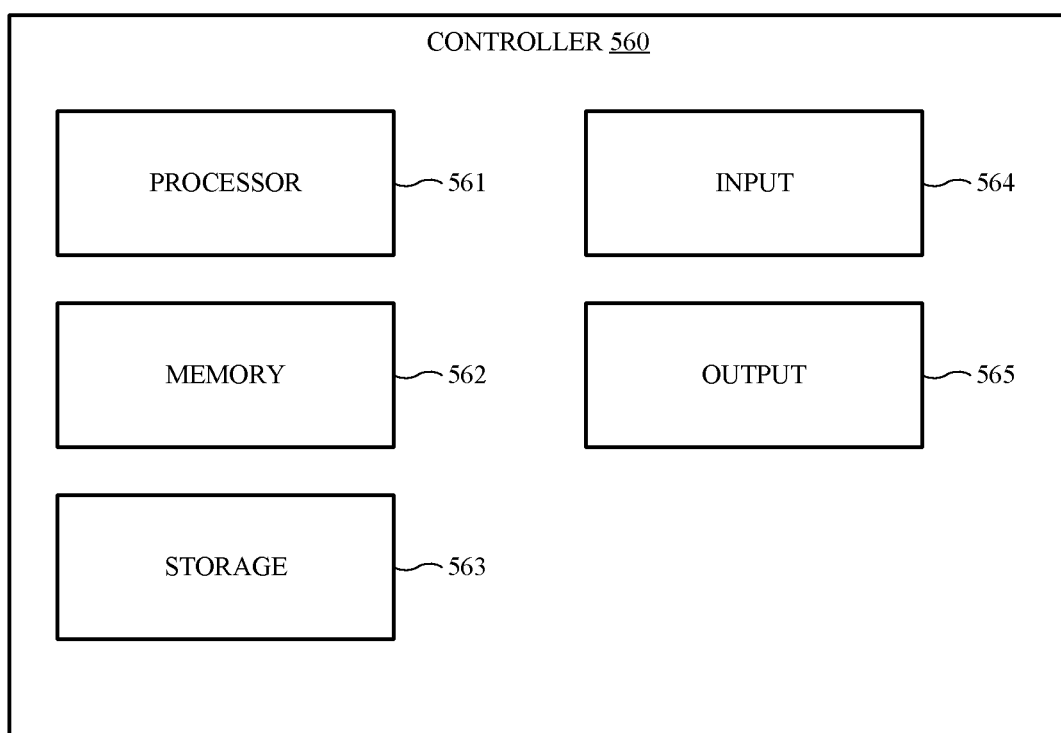
FIG. 5 is a block diagram that shows an example of a hardware configuration for a controller.

FIG. 5 is a block diagram that shows an example of a hardware configuration for a controller 560. The controller 560 may be used to implement control systems described herein, such as the battery system controller 104 of the battery system 100 and the control system of the electric system (e.g., vehicle). The controller 560 may include a processor 561, a memory 562, a storage device 563, one or more input devices 564, and one or more output devices 565. The controller 560 may include a bus or a similar device to interconnect the components for communication. The processor 561 is operable to execute computer program instructions and perform operations described by the computer program instructions. As an example, the processor 561 may be a conventional device such as a central processing unit. The memory 562 may be a volatile, high-speed, short-term information storage device such as a random-access memory module. The storage device 563 may be a non-volatile information storage device such as a hard drive or a solid-state drive. The input devices 564 may include any type of human-machine interface such as buttons, switches, a keyboard, a mouse, a touchscreen input device, a gestural input device, or an audio input device. The output devices 565 may include any type of device operable to provide an indication to a user regarding an operating state, such as a display screen or an audio output, or any other functional output or control.

As described above, one aspect of the present technology is controlling charging and discharging of a battery, which may be implemented in a system that includes the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to store user activity information that allows a power management system to control energy usage according to user preferences or user habits. Further, other uses for personal information data that benefit the user are also contemplated by the present disclosure. For example, location information and navigation information may be used as a basis for controlling use of electrical power from a battery based on availability of battery charging stations near the user or along a route being followed by a user.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, systems that use the present technology can be configured to allow users to select to "opt in" or "opt out" of participation in the collection of personal information data during registration for services or anytime thereafter. In another example, users can select not to provide personal information to services that use the present technology. In yet another example, users can select to limit the length of time personal information is maintained by services that use the present technology, or users may entirely prohibit use of personal information by systems that use the present technology. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, a power management system may control battery usage using a model based on non-personal information data or a bare minimum amount of personal information, other non-personal information available to the services that are using the present technology, or publicly available information.

What is claimed is:

1. A system, comprising:
a first bus;
a second bus;
a first load that is connected to the first bus;
a second load that is connected to the second bus;
a high-voltage battery that includes a first plurality of cells and outputs electrical power at a first voltage level,
a low-voltage battery that includes a second plurality of cells and outputs electrical power to the second bus at a second voltage level that is lower than the first voltage level, wherein a common cell type is used for the first plurality of cells and the second plurality of cells, and
a number of individual cells included in the first plurality of cells is an integer multiple of a number of individual cells that is included in the second plurality of cells;
a first DC-DC converter that connects the high-voltage battery to the first bus to transfer electrical power between the high-voltage battery and the first bus, wherein the first DC-DC converter is operable to convert electrical power between the first voltage level and the second voltage level,
a second DC-DC converter that connects the first bus to the second bus to transfer electrical power between the first bus and the second bus at the second voltage level; and
a controller that is configured to control operation of the first DC-DC converter and the second DC-DC converter in one of a first operating mode in which the first load and the second load are powered by the high-voltage battery, a second operating mode in which the first load and the second load are powered by the low-voltage battery, and a third operating mode in which the high-voltage battery is charged by the low-voltage battery.

2. The system of claim 1, wherein the individual cells from the first plurality of cells are connected in series and the individual cells from the second plurality of cells are connected in series.

3. The system of claim 1, wherein the first plurality of cells is not directly connected to the second plurality of cells.

4. The system of claim 1, further comprising:
a battery pack housing, wherein the high-voltage battery and the low-voltage battery are located in the battery pack housing.

5. The system of claim 1, wherein in the first operating mode, electrical power is supplied to the first bus by the high-voltage battery using the first DC-DC converter, electrical power is transferred from the first bus to the second bus by the second DC-DC converter, the first load receives electrical power from the first bus, and the second load receives electrical power from the second bus.

6. The system of claim 1, wherein in the second operating mode, electrical power is supplied to the second bus by the low-voltage battery, electrical power is transferred from the second bus to the first bus by the second DC-DC converter, the first load receives electrical power from the first bus, and the second load receives electrical power from the second bus.

7. The system of claim 1, wherein in the third operating mode, electrical power is supplied to the second bus by the low-voltage battery, electrical power is transferred from the second bus to the first bus by the second DC-DC converter, and electrical power is transferred from the first bus to the high-voltage battery using the first DC-DC converter to charge the high-voltage battery.

8. A system, comprising:
a first bus;
a second bus;
a high-voltage battery that includes a first plurality of cells;
a low-voltage battery that includes a second plurality of cells, wherein the low-voltage battery is connected to the second bus;
a first DC-DC converter that connects the high-voltage battery to the first bus;
a second DC-DC converter that connects the first bus to the second bus; and
a controller that is configured to control operation of the first DC-DC converter and to control operation of the second DC-DC converter to charge the high-voltage battery using electrical power from the low-voltage battery.

9. The system of claim 8, wherein a common cell type is used for the first plurality of cells and the second plurality of cells.

10. The system of claim 8, wherein a number of individual cells included in the first plurality of cells is an integer multiple of a number of individual cells that is included in the second plurality of cells.

11. The system of claim 8, wherein the first plurality of cells includes a first number of individual cells that are connected in series and the second plurality of cells includes a second number of individual cells that are connected in series.

12. The system of claim 8, wherein the first plurality of cells is not directly connected to the second plurality of cells.

13. The system of claim 8, wherein the first DC-DC converter is operable to convert electrical power between a first voltage level that corresponds to the high-voltage battery and a second voltage level that corresponds to the first bus.

14. The system of claim 8, wherein the first bus and the second bus are at a common voltage level, and the second DC-DC converter is operable to transfer electrical power between the first bus and the second bus at the common voltage level.

15. The system of claim 14, wherein only the second DC-DC converter connects the first bus to the second bus for transferring electrical power between the first bus and the second bus.

16. The system of claim 8, wherein the controller is further configured to control operation of the first DC-DC converter to transfer power between the high-voltage battery and the first bus and to control operation of the second DC-DC converter to transfer power between the first bus and the second bus.

17. A system, comprising:
a first bus;
a second bus;
a first load that is connected to the first bus;
a second load that is connected to the second bus;
a high-voltage battery that includes a first plurality of cells;
a low-voltage battery that includes a second plurality of cells, wherein the low-voltage battery is connected to the second bus;
a first DC-DC converter that connects the high-voltage battery to the first bus;
a second DC-DC converter that connects the first bus to the second bus; and
a controller that is configured to control operation of the first DC-DC converter and the second DC-DC converter in one of a first operating mode in which the first load and the second load are powered by the high-voltage battery, a second operating mode in which the first load and the second load are powered by the low-voltage battery, and a third operating mode in which the high-voltage battery is charged by the low-voltage battery.

18. The system of claim 17, wherein in the first operating mode, electrical power is supplied to the first bus by the high-voltage battery using the first DC-DC converter, electrical power is transferred from the first bus to the second bus by the second DC-DC converter, the first load receives electrical power from the first bus, and the second load receives electrical power from the second bus.

19. The system of claim 17, wherein in the second operating mode, electrical power is supplied to the second bus by the low-voltage battery, electrical power is transferred from the second bus to the first bus by the second DC-DC converter, the first load receives electrical power from the first bus, and the second load receives electrical power from the second bus.

20. The system of claim 17, wherein in the third operating mode, electrical power is supplied to the second bus by the low-voltage battery, electrical power is transferred from the second bus to the first bus by the second DC-DC converter, and electrical power is transferred from the first bus to the high-voltage battery using the first DC-DC converter to charge the high-voltage battery.

21. The system of claim 17, wherein the first DC-DC converter is operable to convert electrical power between a first voltage level that corresponds to the high-voltage battery and a second voltage level that corresponds to the first bus.

22. The system of claim 17, wherein the first bus and the second bus are at a common voltage level, and the second DC-DC converter is operable to transfer electrical power between the first bus and the second bus at the common voltage level.

23. The system of claim 17, wherein a common cell type is used for the first plurality of cells and the second plurality of cells.

24. A system, comprising:
a first bus;
a second bus;
a first load that is connected to the first bus;
a second load that is connected to the second bus;
a high-voltage battery that includes a first plurality of cells and outputs electrical power at a first voltage level;
a low-voltage battery that includes a second plurality of cells and outputs electrical power to the second bus at a second voltage level that is lower than the first voltage level, wherein a common cell type is used for the first plurality of cells and the second plurality of cells;
a first DC-DC converter that connects the high-voltage battery to the first bus;
a second DC-DC converter that connects the first bus to the second bus; and
a controller that is configured to control operation of the first DC-DC converter and the second DC-DC converter to charge the high-voltage battery using electrical power from the low-voltage battery.

25. The system of claim 24, wherein the first DC-DC converter is operable to convert electrical power between the first voltage level and the second voltage level.

26. The system of claim 24, wherein the first bus and the second bus are at the second voltage level, and the second DC-DC converter is operable to transfer electrical power between the first bus and the second bus at the second voltage level.

27. The system of claim 24, further comprising:
a battery pack housing, wherein the high-voltage battery and the low-voltage battery are located in the battery pack housing.

28. The system of claim 24, wherein the first plurality of cells is not directly connected to the second plurality of cells.

29. The system of claim 24, wherein the controller is further configured to control operation of the first DC-DC converter and the second DC-DC converter to selectively supply electrical power from the high-voltage battery to the first load and the second load or supply electrical power from the low-voltage battery to the first load and the second load.

* * * * *